(12) United States Patent (10) Patent No.: US 8,803,674 B2
Langlois (45) Date of Patent: Aug. 12, 2014

(54) TURN SIGNAL INDICATOR SYSTEM FOR BICYCLES

(76) Inventor: Damon Langlois, Victoria (CA)

(*) Notice: Subject to any disclaimer, the term of this patent is extended or adjusted under 35 U.S.C. 154(b) by 20 days.

(21) Appl. No.: 13/558,793

(22) Filed: Jul. 26, 2012

(65) Prior Publication Data

US 2013/0033370 A1 Feb. 7, 2013

Related U.S. Application Data

(60) Provisional application No. 61/514,829, filed on Aug. 3, 2011.

(51) Int. Cl.
*B62J 3/00* (2006.01)
(52) U.S. Cl.
USPC ........... 340/432; 340/464; 340/468; 340/471; 340/473; 340/475; 362/473; 362/475

(58) Field of Classification Search
USPC ................ 340/342, 464, 468, 471, 473, 475; 362/473, 475
See application file for complete search history.

(56) References Cited

U.S. PATENT DOCUMENTS

| 4,204,191 A * | 5/1980 | Daniels ......................... 340/432 |
| 5,418,696 A * | 5/1995 | Izzo Sr. ......................... 362/473 |
| 5,933,076 A * | 8/1999 | Babb ............................ 340/475 |
| 6,109,770 A * | 8/2000 | Choimet et al. .............. 362/473 |

* cited by examiner

*Primary Examiner* — Tai T Nguyen
(74) *Attorney, Agent, or Firm* — Davis & Bujold, PLLC; Michael J. Bujold

(57) ABSTRACT

A turn signal system for a bicycle comprises a left and right front and rear turn signal and a rear alert signal that has multi-mode operation. The system is battery powered and can be adapted to an electric bicycle having a variety of power voltages. The system includes a controller and a multi-axis accelerometer to actuate the alert signal in the event of sudden deceleration.

16 Claims, 8 Drawing Sheets

TURN SIGNAL INDICATOR SYSTEM FOR BICYCLES

REFERENCE TO OTHER RELATED APPLICATIONS

This application claims the benefit of U.S. Provisional Patent Application No. 61/514,829 filed in the USPTO on Aug. 3, 2011 for an invention entitled Turn Signal Indicator System for Bicycles.

FEDERAL SPONSORSHIP OF RESEARCH

N/A

FIELD OF THE INVENTION

The invention pertains to the field of signals and indicators (Class 116) and particularly to signals and indicators for vehicle motion and direction (Sub-class 35R) and specifically to a turn signal and braking indicator system for bicycles.

BACKGROUND TO THE INVENTION

Bicycles are becoming a more prevalent mode of transportation due to automobile fuel costs, increased pollution and traffic congestion. This is especially true in urban areas where bicycles and automobiles are often forced to share the same road. Conflicts occur resulting in accidents, damage and injury. Accident analysis reveals that visibility of the cyclist and inappropriate behaviour of the cyclist, such as not signalling a lane change or a turn, are major contributing factors. Hand signals are often used by a cyclist to indicate a turn or a stop. However, this requires the cyclist to remove a hand from the handle bar and increases the risk of loss of control. Road junctions will remain a serious hazard for automobile drivers and bicycle riders if the rider cannot indicate her intention and the driver does not know where the rider is going.

There are a number of signal light indicators on the market today by a variety of manufacturers. Some mimic police and emergency vehicle lighting and so are over-engineered, expensive and draw too much power. Others are too dim to function as a reliable indicator. Still others require the rider to remove a hand from the handle bar to manipulate a centrally mounted turn signal control pad.

Therefore, there is a continued need for a bicycle turn signal and brake indicator that is visible, reliable, and easy to operate by touch, controls power consumption and is affordable.

SUMMARY OF THE INVENTION

To overcome the problems noted above, my invention is a novel and inventive bicycle turn signal indicator and brake light system. The system has the following main features: front and rear turn signal lights; rear alert light for braking, a bump in the road, sudden change of direction; a rear running light (flashing); and, hazard lights (all four signal lights flashing in unique pattern). The system is battery operated with optional external power input from an external battery pack. The battery of the system can be augmented by a solar power cell attached to the alert light housing and/or to the bicycle. The battery can be rechargeable by solar DC or household AC power. In one embodiment of the invention there is provided a left front signal light that is orange in colour coupled to a left rear signal that is also orange in colour. In one embodiment of the invention the turn signal indicator is an LED that flashes on and off at a rate similar to a car turn signal light. The left turn signal button is conveniently mounted to the handlebar proximate to the handle grip so that the rider can actuate the front and rear left turn signals by thumb or finger without having to release the handgrip. A single momentary press on the turn signal button will engage the left front and rear signals. The rider does not have to maintain pressure on the signal actuator in order to maintain an illuminated signal. By way of a timer incorporated into the signal control logic, the signals will remain illuminated and blinking for a predetermined period of time and then shut off automatically. Alternatively, the rider can press the turn signal indicator button a second time in order to turn the turn signal off.

Other control functions include a press and hold button function that will power the system down. Subsequently, a single press of the left or right front signal button will turn the system on and engage the running light.

The right front signal is electrically and logically coupled to the right rear signal. They operate in an identical manner to the left front and left rear signals. There is a push button located proximate to the right handle grip so that the rider does not have to move her hand from the handle bar in order to operate the turn signal.

Pressing the right and left hand buttons simultaneously will engage a hazard light mode which is the same as a four-way flasher system on an automobile.

The front left and right turn signals and associated push buttons are wired to a single wire that connects to a controller mounted to a control board and to power source located within the housing of the rear alert light. The cables from the left and right front switches and signal light assemblies come together at a Y junction. A single wire runs from the pair of turn signal indicators to the rear unit that houses the controller. That wire includes a disconnect proximate to the rear alert light housing so that it can be removed from the bicycle for security.

Located between the left and right rear turn signal indicators which are orange in colour is the rear alert light which is red in colour. The rear alert light includes a running mode that remains illuminated continuously or in a predetermined blinking pattern as long as the system is turned on. When in a running mode, the rear alert light is less bright than the alert mode. In the alert mode the single running light LED or multiple LEDs will illuminate brightly similar to a brake light on an automobile. The rear alert light switches automatically from a running mode to an alert mode using a multi-axis accelerometer that will sense any axial deceleration such as during a braking manoeuvre or when the bicycle hits a bump in the road. The multi-axis accelerometer detects and analyzes the difference between general smooth riding and random deceleration events and will trigger the rear alert light to the alert mode when these events occur. The alert mode will remain illuminated for a predetermined length of time that is programmed into the system controller. In another embodiment of the invention the accelerometer can signal the alert mode to assume the running mode when the bicycle accelerates and resumes a normal pattern of smooth operation. The alert light can also be triggered from switch equipped brake leavers. In these brake leavers commonly equipped on electric scooters and electric bikes the switch is normally used for turning off the motor when the brake is applied. In our controller we will take this switch input and use it to trigger the alert light on and off but also pass the signal through to the motor so the brake lever switch can still turn the motor on and off.

The system controller includes a power management module, accelerometer and controller that controls the switching logic, timers, flashing relays and patterns, filtering and activation logic for the rear alert light, power down and power up logic.

The system will also accept an external power sources to allow the lights to operate using other sources of power such as an external battery back, a battery pack for an electric motor such as found on electric bicycles or a hub generator to power a rechargeable battery pack. The system of the invention can operate using a variety of voltages ranging from 6VDC up to 80VDC. The power supply can be rectified to other voltages such as 6VDC or 12VDC to power a headlight or horn, or popular voltages used for portable telephones or music players.

DETAILED DESCRIPTION

The present invention will now be described in detail hereinafter by reference to the accompanying drawings. The invention is not intended to be limited to the embodiments described; rather, this detailed description is provided to enable any person skilled in the art to make and use the invention.

Figure 1:
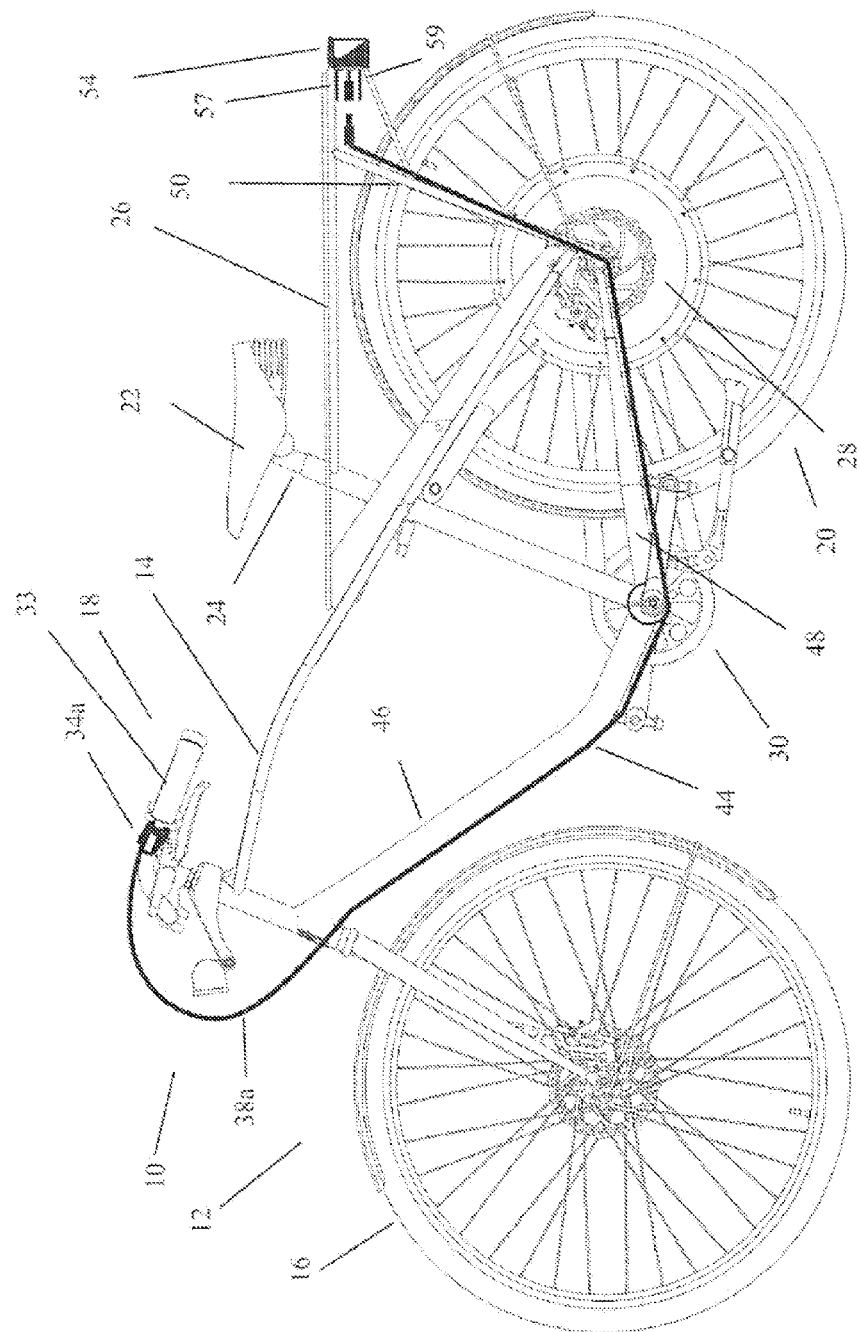
FIG. 1 is a side view of one embodiment of the invention mounted to a bicycle.
Figure 2:
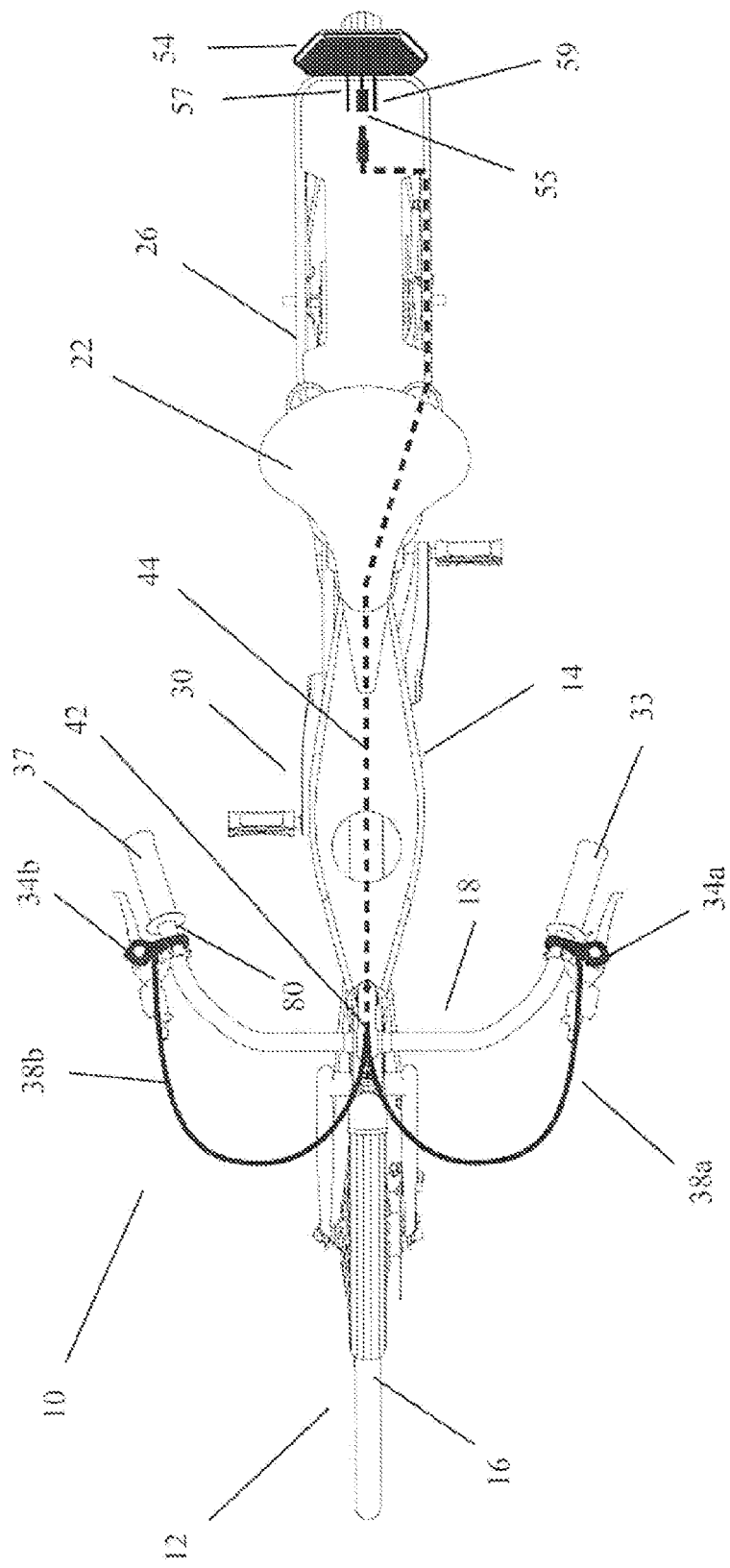
FIG. 2 is a top view of one embodiment of the invention mounted to a bicycle.

Referring to FIG. 1 and FIG. 2 there is shown one embodiment of the invention signal light system 10 mounted to a bicycle 12. FIG. 1 illustrates the bicycle and invention in a side view and FIG. 2 illustrates the bicycle and invention in a top view.

The bicycle is of a typical design comprising a frame 14 assembly, a front wheel assembly 16, a handle bar assembly 18, a rear wheel assembly 20, a seat 22 mounted on a seat post 24, and a carrying frame 26. The rear wheel assembly 20 is illustrated with a hub 28 which could be an electric motor or an electrical generator. Also illustrated is a crank assembly 30.

The light system 10 comprises a left signal housing 34, an identical right signal housing 34b, a left housing cable 38a joining a right housing cable 38b at a "Y" junction 42, an intermediate cable 44 runs along the underside members 46 and 48 of bicycle frame 14 and up member 50 of carrying frame 26 to a rear signal housing 54. Each of the left and right signal housing contains at least one LED 107a and 107b respectively. There is a disconnect 55 in cable 44 proximate to the rear signal housing 54 so that the rear signal housing can be removed for security. Also illustrated as line 57 and line 59 are additional connections that permit charging apparatus to connect to the internal battery, external battery packs to connect to the rear signal housing and solar cells to connect to the internal battery. The rear alert signal housing contains battery pack and first circuit/control board more fully detailed below.

Figure 3:
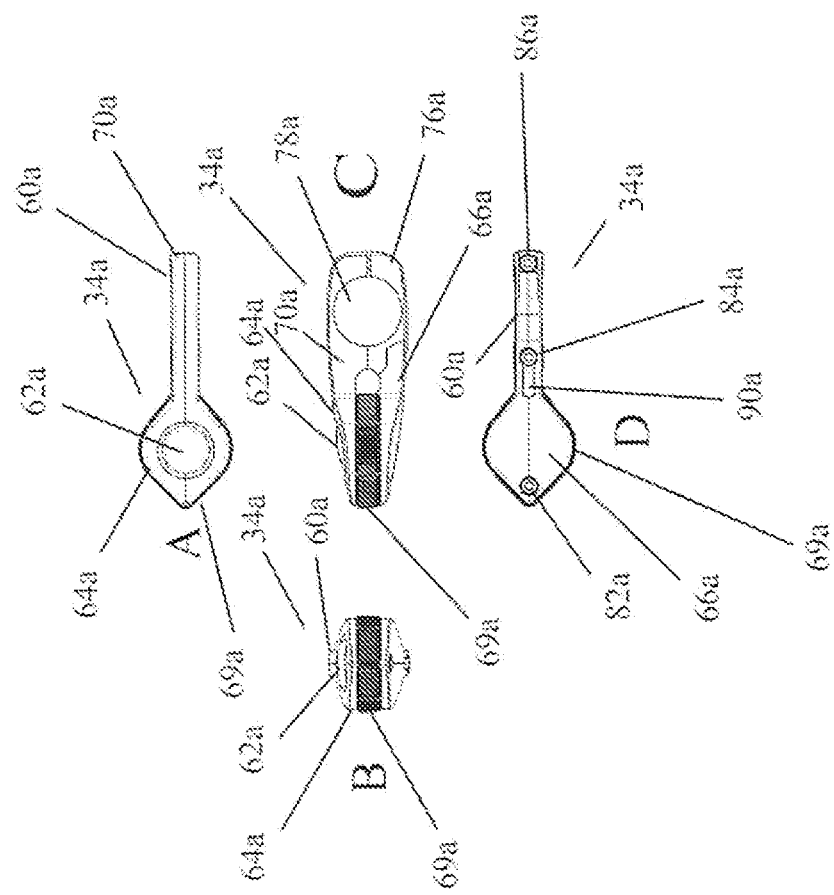
FIG. 3A is a top view of a signal housing and mounting bracket of one embodiment of the invention.
FIG. 3B is a front view of the signal housing and mounting bracket of FIG. 3A.
FIG. 3C is a side view of the signal housing and mounting bracket of FIG. 3A.
FIG. 3D is a bottom view of the signal housing and mounting bracket of FIG. 3A.

Referring now to FIGS. 3A to 3D there are illustrated one embodiment of the left 34a signal housing which is identical to the right 34b signal housing; therefore only the left 34a signal housing is diagrammed. Further references to the elements of the left 34a signal housing are designated "a" and references to the right 34b signal housing are designated "b". FIG. 3A illustrates a top view of the left signal housing 34a which is integrated with a mounting bracket 60a. FIG. 3A shows the momentary push button 62a disposed centrally within the signal housing 34a. FIG. 3B illustrates a front view of the housing 34a comprising a top section 64a and a bottom section 66a. The bottom section 66a integrates the knurled portion 69a that surrounds the middle portion 70a of the housing 34a. Knurled portion 69a is a translucent lens for distributing light in an almost 360 degree arc. Button 62a is shown disposed on the top section 64a. The bottom section 66a is transparent and contains the signal light 107a as more fully explained and illustrated below. FIG. 3C illustrates a left side view of the left signal housing 34a integrated with mounting bracket 60a. The left housing top section 64a is integrated with the top section 74a of mounting bracket 60a. The left housing bottom section 66a and knurled portion lens 69a are separate from the bottom section 76a of mounting bracket 60a. The annulus 78a is sufficiently dimensioned to accommodate the diameter 92 of a handle bar 80. FIG. 3D illustrates a bottom view of the housing 34a and mounting bracket 60a. The bottom section 66a of the left signal housing 34a is transparent and contains the signal light. The bottom section 76a of the mounting bracket 60a is separate from the bottom section 66a of the left signal housing. A first mounting screw 82a joins the bottom section 66a of the left signal housing 34a to the top section 64a. A second 84a and a third 86a screw are used for fixing the mounting bracket bottom section 76a to the top section 74a and around the handle bar 80. Slide gap 90a is used so that the signal light can be positioned in a desired manner.

Figure 4:
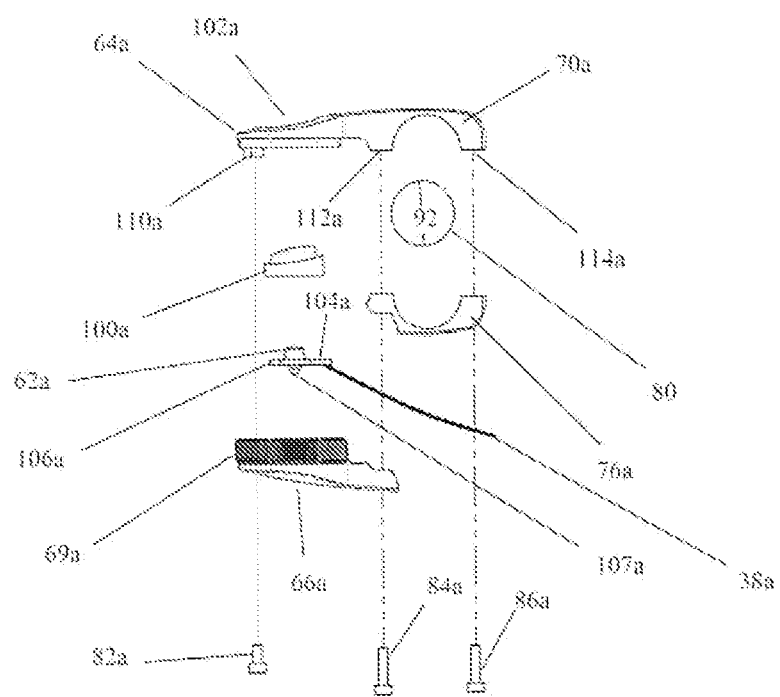
FIG. 4 is an assembly diagram of the signal housing and mounting bracket of FIG. 3A.

Referring now to FIG. 4, there is shown an assembly view of one embodiment of the left signal housing 34a which is identical to the right signal housing 34b. The momentary push button 62a is covered with a weather proof elastomer cover 100a. The push button 62a and cover 100a assembly are mounted through hole 102a in the top portion 64a of the left signal housing 34a. The button 62a is mounted to the top surface 104a of a second circuit board 106a. A light 107a is mounted to the bottom surface 108a of the second circuit board 106a. The second circuit board 106a also contains controllers and logic to control the operation of the light 107a once it is actuated by the button 62a. Such control includes blink rate and on duration. The left housing cable 38a is connected to the circuit board 106a to provide power to the light 107a. In the preferred embodiment of the invention the lights 107a and 107b will be high intensity LEDs. The bottom portion 66a of the left signal housing 34a is transparent so that the light 107a can be viewed. The knurled portion lens 69a is attached to the transparent bottom portion 66a. The mounting bracket 60a atop portion 70a is integral with the top portion 64a of the housing 34a. The bottom portion 76a of the mounting bracket is mated with the top portion over the handle bar 80. The bottom portion 76a of the mounting bracket is slidingly adjustable by way of gap 90a with respect to the bottom portion 66a of the housing to permit a desired positioning of the housing 34a. Mounting screw 82a is screwed into threaded receiver 110a to fix the bottom 66a and the top 64a of the housing 34a together. Mounting screws 84a and 86a are screwed into threaded receivers 112a and 114a respectively to mount the housing to the handle bar 80.

Figure 5:
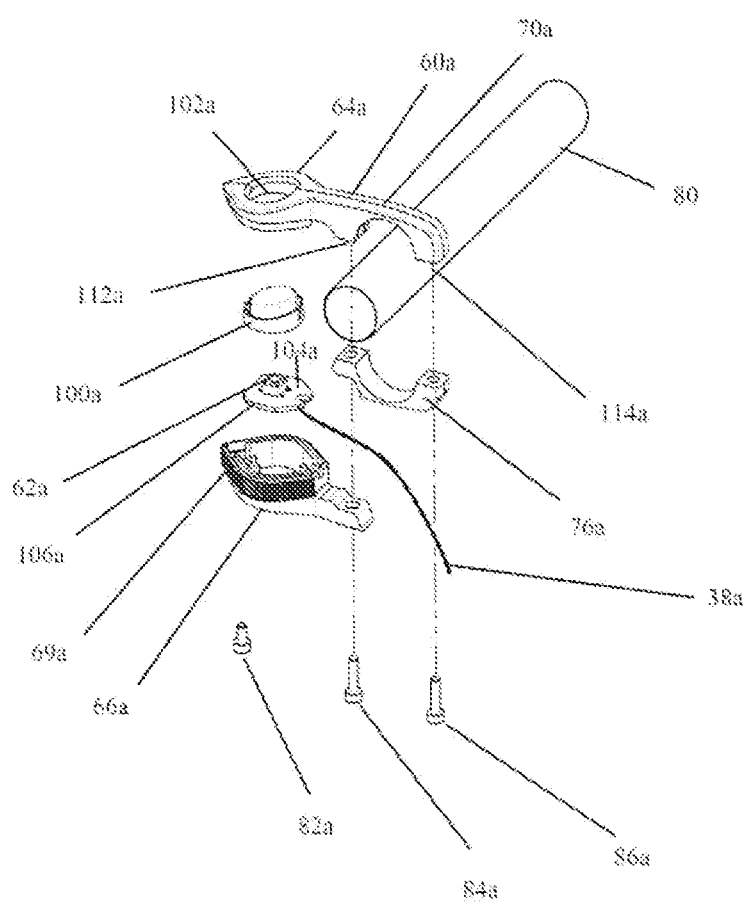
FIG. 5 is an assembly diagram of the signal housing and mounting bracket of FIG. 4.

Referring now to FIG. 5, there is shown another assembly perspective view of the same embodiment of the left signal housing 34a in FIG. 4 which is identical to the right signal housing 34b. The momentary push button 62a is covered with a weather proof elastomer cover 100a. The push button 62a and cover 100a assembly is mounted through hole 102a in the top portion 64a of the left signal housing 34a. The button 62a is mounted to the top surface 104a of a second circuit board 106a. The second circuit board 106a also contains controllers and logic to control the operation of the light 107a once it is actuated by the button 62a. Such control includes blink rate and on duration. The right housing cable 38b is connected to the right hand housing 34b second circuit board 106b to provide power to the light 107b. The bottom portion 66a of the left signal housing 34a is transparent so that the light 107a can be viewed. The knurled portion lens 69a is attached to the transparent bottom portion 66a. The mounting bracket 60a top portion 70a is integral with the top portion 64a of the housing 34a. The bottom portion 76a of the mounting bracket is mated with the top portion over the handle bar 80. Mounting screw 82a is screwed into threaded receiver 110a to fix the bottom 66a and the top 64a of the housing 34a together. Mounting screws 84a and 86a are screwed into threaded receivers 112a and 114a respectively to mount the housing to the handle bar 80.

Figure 6:
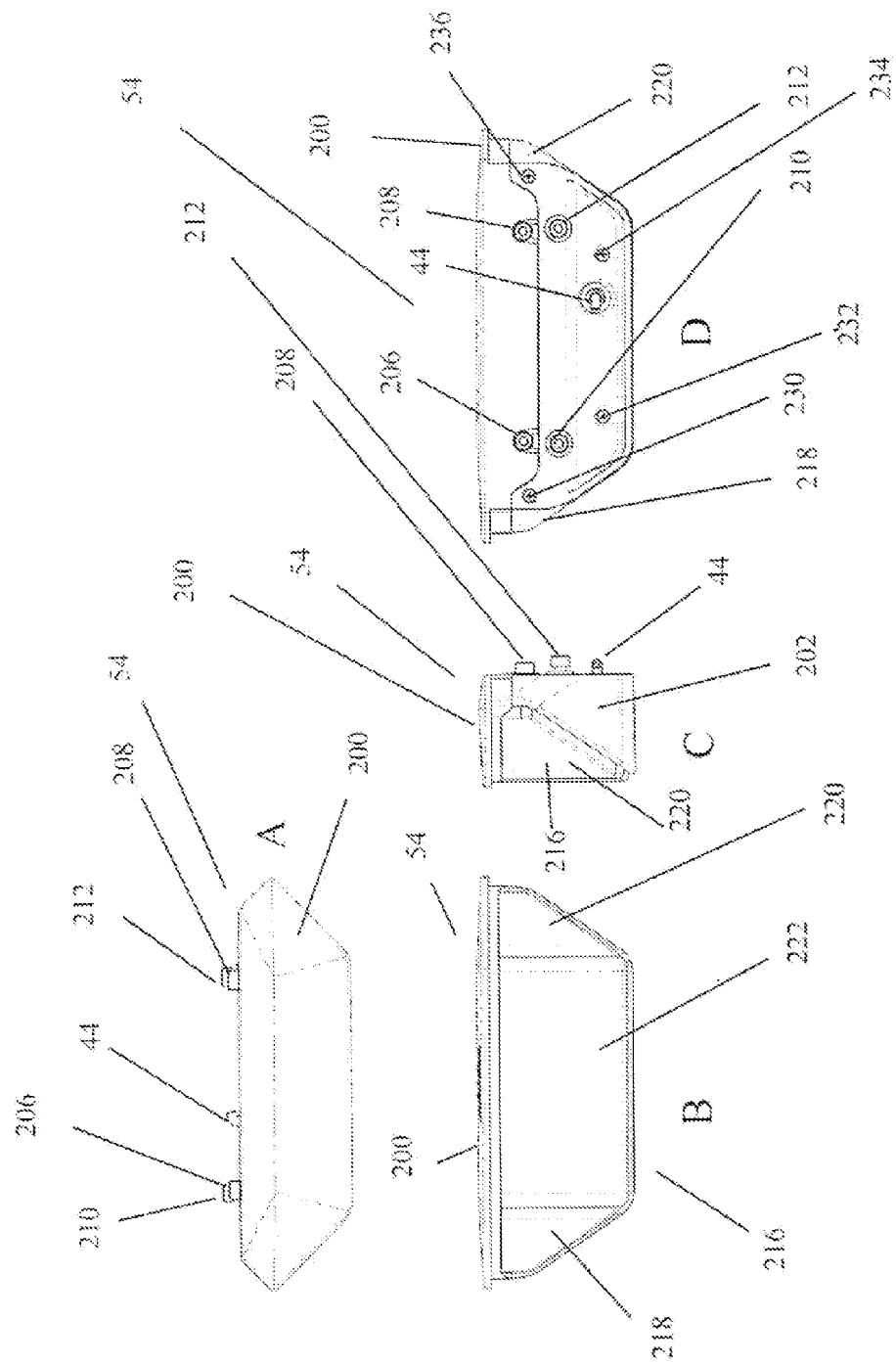
FIG. 6A is a top view of a rear alert light assembly of one embodiment of the invention.
FIG. 6B is a front view of the rear alert light assembly shown in FIG. 6A.
FIG. 6C is a left side view of the rear alert light assembly shown in FIG. 6A.
FIG. 6D is a rear view of the rear alert light assembly shown in FIG. 6A.

Referring now to FIG. 6A to 6D there is shown various views of the rear alert light assembly 54. FIG. 6A shows a top view, FIG. 6B shows a front view, FIG. 6C shows a right side view and FIG. 6D shows a review view of the rear alert light assembly. FIG. 6A illustrates a top cover 200 which is mounted to the body 202 of the rear alert light 54. The top cover 200 is snap fit to the body 202 and when removed reveals a battery compartment. Also illustrated in FIG. 6A are the assembly screws 206 and 208 which hold the assembly together and mounting screws 210 and 212 to mount the rear alert light to the bicycle. The power input/output cable 44 is also shown.

FIG. 6B illustrates the front face 216 of the rear alert light 54. It is a transparent lens fixed over at least three LEDs identified in FIG. 7. The lens comprises three sections. There is a left section 218, a right section 220 and a middle section 222. The left section 218 and the right section 220 are amber and are for directional signaling. The middle section 222 is red and is for braking signals.

FIG. 6C illustrates the right side of the rear alert light 54 and the right section 220 of the lens 216. The body of the alert light 202 is a moulded polymer to contain the battery, the lights and the system control board of the invention. Top cover 200 is snap fit to the top of the body 202 to enclose the battery pack 240 and first control board 250. The front face transparent lens 216 is fixed to the body by screws 206 and 208 illustrated in FIG. 7. Mounting screws 210 and 212 are illustrated as is the terminus of cable 44.

FIG. 6D is a rear view of the alert light 54 comprising a top cover 200, a front transparent lens 216 of which a portion of the left section 218 and right section 220 are shown. The lens 216 is mounted to the body 202 by screws 206 and 208. Screws 210 and 212 mount the rear alert light to the bicycle. Screws 230 to 236 inclusive mount the system control board to the body 202.

Figure 7:
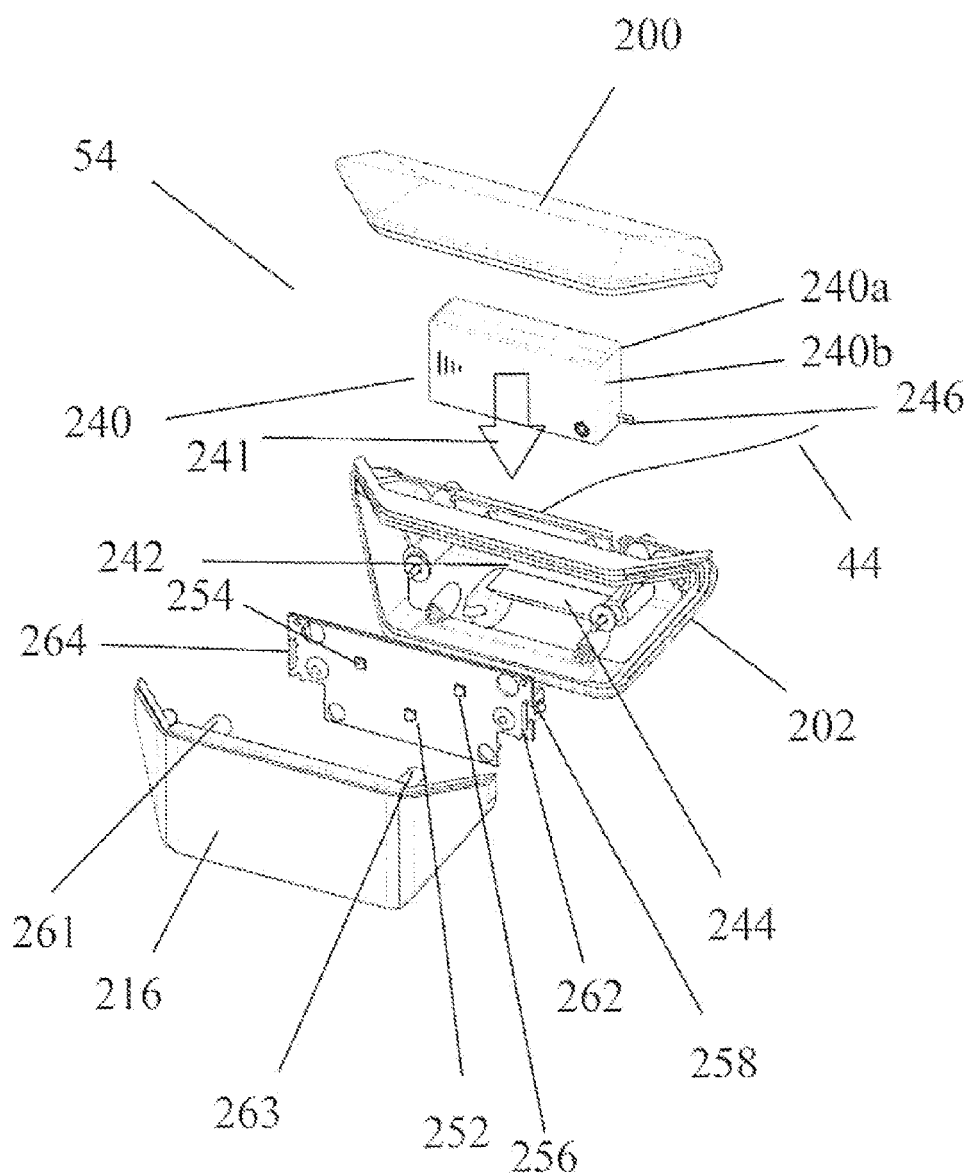
FIG. 7 is an assembly diagram of the rear alert light assembly of FIG. 6A.

Referring now to FIG. 7, there is shown an assembly diagram of the rear alert light 54. Battery pack 240 is inserted 241 into battery compartment 242 and rests upon the battery support 244. The battery pack illustrated is two-piece case (240a and 240b) which snap-fit together and hold, for example, two AA or two AAA size batteries. Cable 246 connects the battery pack to the control board 250 which distributes power to the at least three LEDs (252, 254, 245) of the rear alert light, the at least one LED 258 of the left and right rear turn signals and the at least one LED 107a and 107b of the left and right front turn signals. In other embodiments of the invention rechargeable batteries can be inserted into the pack 240 and then recharged by connection to an external power source such as a solar panel attached to the bicycle or a household power source. The pack can be replaced with lithium-ion batteries or a 9 volt battery. An external battery pack can be connected to the system to extend duration of the on-board batteries. The system of the invention can operate using a variety of voltages ranging from 6VDC up to 80VDC. The power supply can be rectified to other voltages such as 6VDC or 12VDC to power a headlight or horn, or popular voltages used for portable telephones or music players. The battery compartment is closed by top cover 200.

First control board 250 is mounted within the body 202 and comprises one light 252 for a running light and two additional lights 254 and 256 for brake and alert lights. Right side light 258 and left side light 260 (not shown) are mounted to a right (third) side control board 262 and a left (fourth) side control board 264. These control boards are attached perpendicular to the first control board 250. The first control board 250 and the attached third and fourth control boards 262 and 264 contain the circuitry and logic for controlling the operation of the rear alert light including brake lights and turn signals. Also contained on the first control board 250 is a multi-axis accelerometer 251 which detects braking to illuminate the brake lights and acceleration to extinguish the brake lights. The accelerometer will also detect when the bicycle hits a bump in the road which may cause the rider to correct the direction of the bicycle and therefore illuminate the brake light as an alert to cars following behind the rider. First control board 250 also comprises a controller 255 that includes a power supply and power management module 253 for prolonged battery life. The first control board 250 is fixed within the body 202 by using screws. The front transparent lens 216 is fixed to the body using screws 206 and 208 with attach to threaded receivers 261 and 263.

Cable 44 connects the power pack 240 to the front turn signals.

Figure 8:
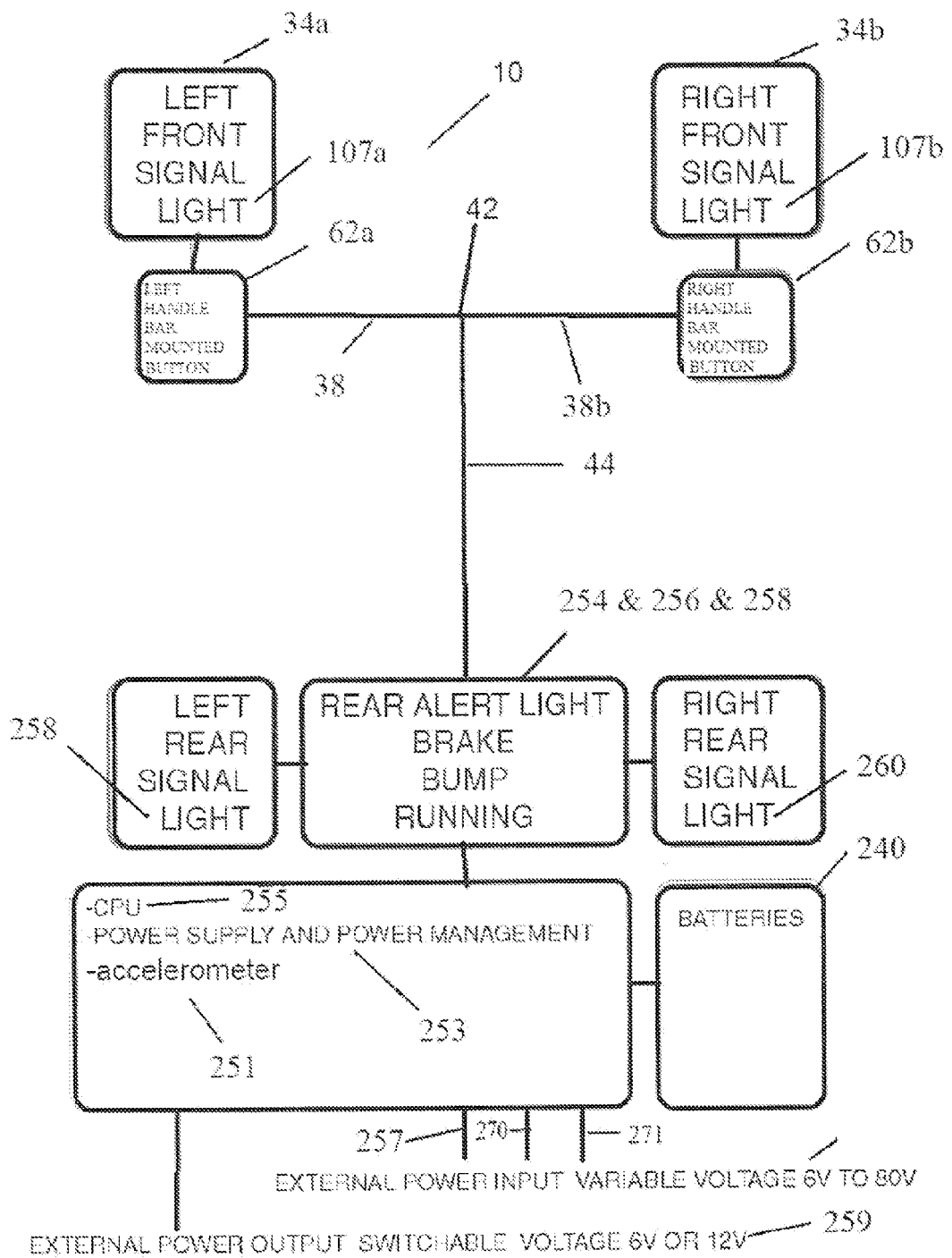
FIG. 8 is a control schematic of one embodiment of the invention.

Referring to FIG. 8, there is shown a schematic of electrical connections and control of the invention. In operation the left and the right front signal light LEDs 107a and 107b within housing 34a and 34b are orange in colour and are operationally coupled to the left rear signal light LEDs 258 and 260 that are also orange in colour. The turn signal indicators flash on and off at a rate similar to a car turn signal light so that a car driver will easily recognize the flashing light as one mounted to a vehicle.

The left turn signal switch button 62a is conveniently mounted to the handlebar 80 proximate to the handle grip 33 so that the rider can actuate the front 107a and rear 258 left turn signals with a single finger or thumb without having to release the handgrip. The right turn signal button on housing 34b is similarly mounted close to handgrip 37. A single momentary press on the left and right turn signal button will engage the left and right front and rear signals respectively. The rider does not have to maintain pressure on the signal button in order to maintain an illuminated signal. By way of a timer incorporated into the signal control logic on circuit board 106a, the signals will remain illuminated and blinking for a predetermined period of time and then shut off automatically. Alternatively, the rider can press the turn signal indicator button a second time in order to turn the turn signal off.

Other control functions on first circuit board 250 include a press and hold button function on both of the left and right mounted turn signal buttons that will power the system down when either button is pressed. Subsequently, a single press of either button will turn the system on and engage. The right front signal light is coupled to the right rear signal light so that they blink together when actuated. They operate in an identical manner to the left front and left rear signal lights. Pressing the right and left turn signal buttons simultaneously together will engage a hazard light mode which is the same as a four-way flasher system on an automobile.

The rear alert light includes a running mode that remains illuminated continuously or in a predetermined blinking pattern as long as the system is turned on. When in a running mode, the rear alert light is less bright than the alert mode. The rear alert light may be a single lamp or LED or multiple LEDs as illustrated in FIG. 7 on first control board 250. The rear alert light switches automatically from a running mode to an alert mode using a multi-axis accelerometer that will sense any axial deceleration such as during a braking manoeuvre or when the bicycle hits a bump in the road. The multi-axis accelerometer 251 detects and analyzes the difference between general smooth riding and random deceleration events and will trigger the rear alert light to the alert mode when these events occur. The alert mode will remain illuminated for a predetermined length of time that is programmed into the controller. In another embodiment of the invention the accelerometer can signal the alert mode to assume the running mode when the bicycle accelerates and resumes a normal pattern of smooth operation.

The system first control board 250 includes a power management module 255, accelerometer 251 and controller 255 that controls the switching logic, timers, flashing relays and patterns, filtering and activation logic for the rear alert light, power down and power up logic. The system will also accept an external power sources to allow the lights to operate using other sources of power such as an external battery back 257 and 259, a battery pack for an electric motor such as found on electric bicycles or a hub generator to power a rechargeable battery pack.

The alert light can also be triggered from switch equipped brake leavers. In these brake leavers commonly equipped on electric scooters and electric bikes the switch is normally used for turning off the motor when the brake is applied. In our controller we will take this switch input 270 and use it to trigger the alert light on and off 271 but also pass the signal through to the motor so the brake lever switch can still turn the motor on and off.

In the drawings and the specification, there has been set forth preferred embodiments of the invention and, although specific terms are employed, the terms are used in a generic and descriptive sense only and not for the purpose of limitation, the scope of the invention being set forth in the following claims.

What is claimed is:

1. A signal light system for a bicycle, said signal light system comprising:
   a. a front left signal light assembly integrated into a first housing;
   b. a front right signal light assembly integrated into a second housing;
   c. said first housing and said second housing electrically connected to a rear signal light assembly intergrated into a third housing;
   d. said third housing containing a power source connected to said front left signal light assembly, said front right signal light assembly and said rear signal light assembly, and a first control board for controlling the signal light system and external power connections connected to said power source;
   wherein each of the left signal light assembly and the right signal light assembly comprises:
      a mounting bracket assembly for attachment of said signal housing to a bicycle handle bar; and
      a signal light housing and each signal housing comprises;
         a translucent bottom section comprising a knurled translucent lens portion and a transparent bottom surface; and
         an opaque top section for mounting a push button assembly for on/off operation fixed to the signal light housing, and said push button assembly comprises a push button and an elastomer cover mounted over said push button; and the push button is mounted to a top surface of a second control board and a signal light is mounted to a bottom surface of said second control board.

2. The signal light system of claim 1 wherein said mounting brackets comprises:
   a. a top portion integrated with said opaque top section and comprising a first hemispherical arc;
   b. an adjustment portion integrated with said translucent bottom section; and,
   c. an independent bottom portion comprising a second hemispherical arc.

3. The signal light system of claim 2 wherein said adjustment portion comprises a gap disposed between the translucent bottom section and said independent bottom portion for sliding adjustment of the signal light housing.

4. The signal light system of claim 3 wherein said top portion and the independent bottom portion are fixed together so that said first and said second hemispherical arcs are mounted around a handle bar.

5. The signal light system of claim 4 wherein said second control board controls a frequency of flashing of said signal light and a duration of operation.

6. The signal light system of claim 5 wherein the third housing comprises a body comprising a battery compartment for enclosing a battery and a mount for mounting the second control board.

7. The signal light system of claim 6 wherein said battery compartment comprises a platform for seating said battery and a snap-sealing top cover.

8. The signal light system of claim 7 wherein said battery comprises one of battery container for holding at least one battery cell and a lithium-ion battery pack.

9. The signal light system of claim 8 wherein the battery is re-chargeable by at least one of a solar cell mounted to said snap-sealing top cover, a second solar cell mounted to said bicycle and an AC power source.

10. The signal light system of claim 9 wherein the battery is augmented by an external battery mounted to the bicycle.

11. The signal light system of claim 10 wherein the first control board comprises a plurality of LEDs mounted thereto.

12. The signal light system of claim 11 wherein a third control board is mounted perpendicular to a left side end of the first control board and wherein a fourth control board is mounted perpendicular to a right side end of the first control board.

13. The signal light system of claim 12 wherein said third and said fourth control boards mount at least one LED for a left rear and right rear turn signal respectively.

14. The signal light system of claim 13 wherein the first control board mounts at least three LEDs, and wherein a first of said three LEDs is a continuously illuminated running light, and wherein said second LED and said third LED of said three LEDs operate upon receiving a command from a multi-axis accelerometer mounted to the second control board.

15. The signal light system of claim 14 wherein said multi-axis accelerometer detects bicycle deceleration during a braking maneuver and subsequently signals the at least three LEDs to illuminate as a brake light.

16. The signal light system of claim 15 wherein the first control board further mounts a controller for controlling the following system functions: power on, power off, timers, four way flashing relays, flashing timers, power supply and power management.

* * * * *